Nov. 23, 1943.  L. G. OLANDER  2,334,787
PLATE FINISHING APPARATUS
Filed Nov. 6, 1939  2 Sheets-Sheet 1

Inventor
LEONARD G. OLANDER
By Chas. C. Reif
Attorney.

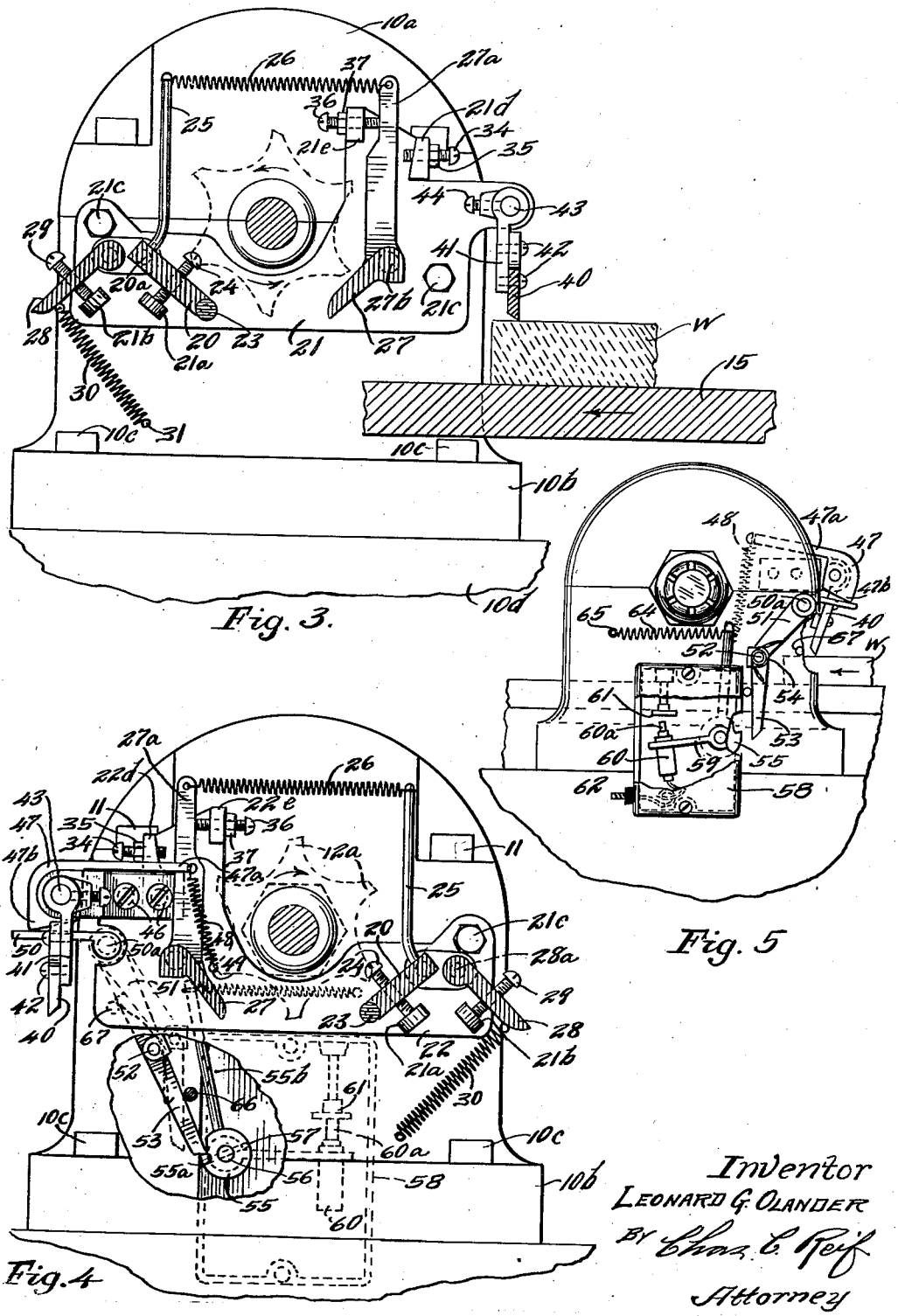

Patented Nov. 23, 1943

UNITED STATES PATENT OFFICE 2,334,787

PLATE FINISHING APPARATUS

Leonard G. Olander, Minneapolis, Minn., assignor to The Monomelt Company, Inc., Minneapolis, Minn., a corporation of Minnesota Application November 6, 1939, Serial No. 303,047

2 Claims. (Cl. 90—18)

This invention relates to a machine having a rotating cutter of cylindrical type for finishing articles, one embodiment of the invention being that of a machine for finishing printing plates. These plates must be quite accurately finished and it is, of course, desirable to have the work quickly and efficiently done.

It is an object of this invention to provide a work holding or engaging means for such a machine so constructed and arranged that should the cutter lift the work said means will not be moved into the path of the cutter.

It is a further object of the invention to provide a work holding means mounted for swinging movement toward and from the work in combination with adjustable means for limiting the swinging movement of said first mentioned means toward or from the work.

It is another object of the invention to provide such a machine having a rotating cutter, a table for supporting the work and moving the same toward and past said cutter, a motor for moving said table, a switch controlling the circuit of said motor, a member engageable by the work on said table should a cut of a certain depth be attempted and means actuated by movement of said member by the work for opening said switch and stopping the movement of said table.

These and other objects and advantages of the invention will be fully set forth in the following description made in connection with the accompanying drawings in which like reference characters refer to similar parts throughout the several views and in which:

Fig. 3 is a vertical section taken substantially on line 3—3 of Fig. 2 as indicated by the arrows;

Fig. 4 is a view partly in side elevation and partly in section taken on line 4—4 of Fig. 2 as indicated by the arrows; and Fig. 5 is a partial view in side elevation, some parts being broken away.

Figure 2:
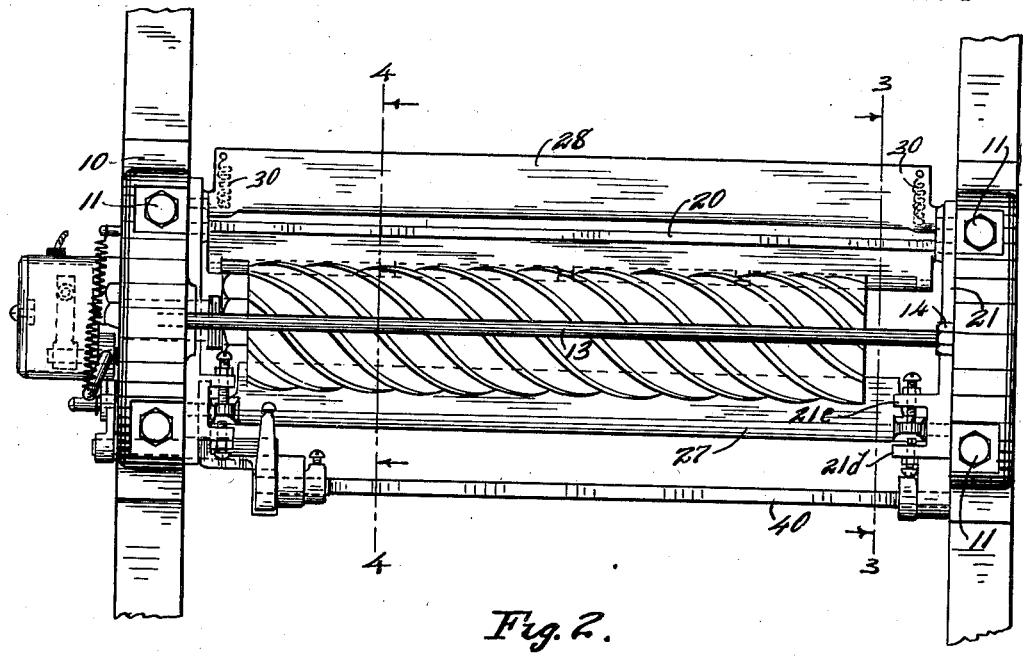
Fig. 2 is a top plan view of the parts shown in Fig. 1.
Figure 1:
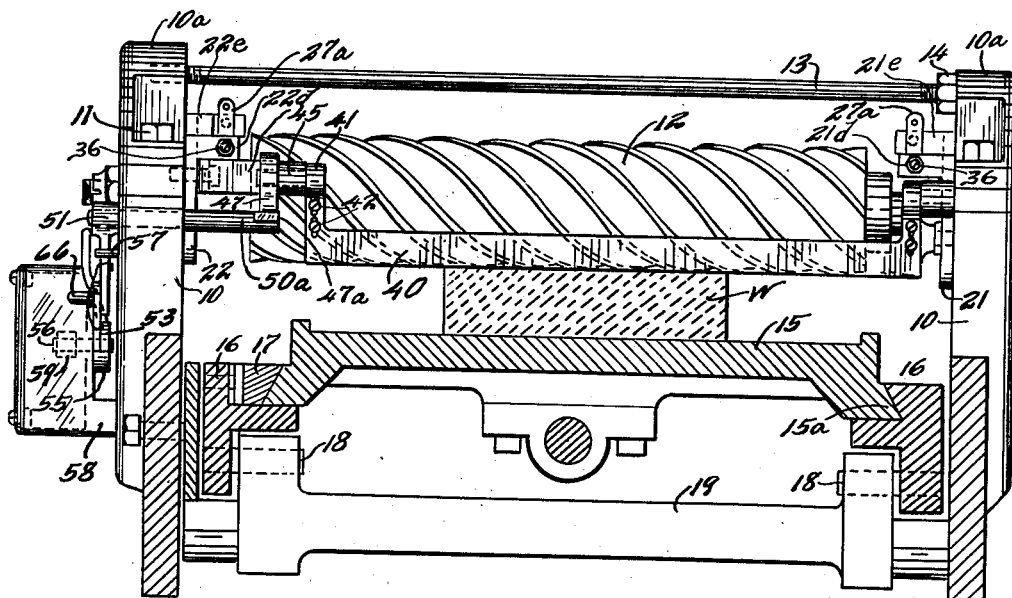
Fig. 1 is a vertical section through a portion of the frame and table of said machine showing the cutter and adjacent parts in front elevation.

Referring to the drawings a machine is shown comprising side frame members 10, the same being illustrated as having cap portions 10a secured in place by cap screws 11. Members 10 form bearings for the end journals of a cylindrical cutter 12 having circumferentially spaced helically extending teeth 12a thereon. Members 10 have flanges 10b which are secured by cap screws 10c to the main frame portions 10d. Said cutter 12 is thus of the milling type. A tie rod 13 extends between the cap members 10a, the same being shown as having a nut 14 at one end engaging one of said cap members. A table 15 is provided which is longitudinally movable beneath and in a plane parallel with the axis of cutter 12, said table having V-shaped guide portions 15a movable in guide members 16. A wedge or gib 17 is shown in one of said members 16. Guide members 16 are carried on pins 18 also received in a supporting member 19. The parts so far described are not new with this invention and are substantially the same as shown in applicant's previously issued Patent No. 2,158,249, granted May 16, 1939.

A work engaging or work holding member 20 is shown at the rear side of cutter 12, the same comprising a bar having end portions formed as trunnions or pivot portions 20a journaled in end brackets 21 and 22 respectively secured by bolts 21c to the inner sides of frame members 10. Member or bar 20 has a roller 23 journaled and carried therein, said roller extending across the machine for a distance slightly greater than the length of cutter 12. At the ends of member or bar 20 the same has therein screws 24 adapted to have their ends engage with fixed stops 21a in the form of lugs projecting from brackets 21 and 22 respectively. Bar 20 also has secured thereto at its ends upstanding rods 25. A tensile coiled spring 26 is connected to the upper end of each rod 25 and the same extends lengthwise of the machine and is connected at its other end to the upper end of a lever arm 27a to be later described. Another work engaging or work holding member 28 is provided beyond member 20, the same being in the form of a flat bar having end trunnion or pivot portions 28a journaled in brackets 21 and 22. Member 28 also has carried therein adjacent its ends screws 29 adapted to engage at their ends with stop members in the form of lugs 21b projecting from brackets 21 and 22. Tensile coiled springs 30 are connected adjacent each end of member 28 at the lower side thereof, the same being connected at their other ends with pins 31 projecting inwardly from frame members 10. It will be seen that by adjustment of screws 24 and 29 the positions of the work engaging portions of members 20 and 28 may be respectively varied.

Another work engaging or work holding member 27 is provided comprising a bar extending transversely of the machine, the same having end trunnion or pivot portions 27b journaled in brackets 21 and 22. Said member 27 has lever arms 27a extending vertically at each end thereof beyond the ends of cutter 12 and as previously stated the springs 26 are connected to the ends of lever arms 27a. Brackets 21 and 22 have lugs 21d and 22d respectively projecting inwardly therefrom and screws 34 extend through said lugs, said screws having thereon jamb nuts 35. Screws 34 are adapted to at times engage lever arms 27a when said arms are swung against the tension of springs 26. Lugs 21e and 22e project inwardly from brackets 21 and 22 respectively and screws 36 extend through said lugs, jamb nuts 37 being disposed on said screws and engaging said lugs. The ends of screws 36 are arranged to be engaged by the sides of the lever arms 27a as the latter are moved by springs 26.

A member 40 extends across the machine in front of cutter 12, the same being supported at its ends on arms 41 to which it is connected by screws 42. Arms 41 are connected to short shafts 43 by set screws 44, which shafts are journaled in bearings 45 having arms extending to and connected to the brackets 21 and 22 by screws 46. At the outer side of bearings 45 one of the shafts 43 has secured thereto a block 47. Block 47 has an arm 47a extending toward cutter 12, the end of which arm has secured thereto a tensile coiled spring 48, the other end of which is connected to a pin 49 projecting from bracket 22. Spring 49 holds arm 47a in contact with a portion of bearing bracket 45 so that member 47 normally occupies the position shown in Fig. 4 with arm 47a substantially horizontal. Member 47 has a somewhat pointed lower end 47b which directly overlies and normally substantially engages the top of an arm 50 carried on a shaft 50a journaled in one of the side members 10 and projecting therethrough. Said shaft 50a has secured thereto beyond said member 10 an arm 51 which is bored at its other end to receive a pivot pin 52 by which it is connected to a pawl 53. Members 51 and 52 are recessed and a coiled torsion spring 54 surrounds pivot 52 and has end portions engaging members 51 and 53. Members 51 and 53 have flat surfaces engaging each other so that when said members are in alinement they form a straightened toggle link as shown in Fig. 4 and they will be retained in this position until arm 51 is swung about the axis of shaft 50a. The lower end of pawl 53 is arranged to engage a ratchet disk 55 secured to a shaft 56 by a pin 57. Shaft 56 is journaled in and extends through the side of a switch box 58 and has secured thereto within said switch box an arm 59. Arm 59 carries an electrical contact member 60 having an exposed contact portion or electrode 60a. Portion 60a is adapted at times to engage another electrical contact 61 carried in switch box 58. Suitable conductors one of which is shown as 62 will be connected to the contacts 60 and 61 respectively and will form part of the circuit of the motor which drives the machine and particularly which moves table 15 having the work W thereon. Disk 55 which is formed with a ratchet tooth 55a has a rod 55b projecting upwardly therefrom, the end of which has connected thereto one end of a tensile coiled spring 64, the other end of which is connected to a pin 65 projecting from the outer side of one of the members 10. A pin 66 also projects from the outer side of member 10 with which the side of pawl 53 engages to control the movements thereof. Another pin 67 projects from member 10 adapted to be engaged by arm 51 when the toggle formed by members 51 and 53 is straightened.

In operation the machine is driven and cutter 12 is rotated in the direction shown by the arrows. Table 15 is reciprocated and the work W, which is usually a printing plate, is suitably held thereon and is moved to and past the cutter 12. The work holders 20, 27 and 28 are provided to hold the work firmly adjacent the cutter. It has been found in practice that on some occasions when a heavy cut is being taken that the cutter 12 tends to lift the work W. This forces up work holder 27 against the tension of the spring which holds it in work engaging position, such as the spring 26 disclosed, with the result that said work holder has been moved into the cutter. This, of course, causes serious damage to the machine. In order to avoid this action the lugs 21d and screws 34 have been provided. The screws 34 can be adjusted so that the ends thereof will engage the lever arm 27a before the member 27 swings into the path of the cutter. The objectionable action of work holding member 27 moving into the cutter is therefore prevented. Work holder 27 can also be nicely adjusted for its work holding position by adjustment of screws 36 which normally engage levers 27a and position member 27 in its work holding position.

Should the operator attempt to take too great a cut off the work W, provision is made for stopping the machine or the movement of table 15. The member 40 is provided and this can be positioned at the proper distance from table 15 so as to be engaged by the work W if too great a cut is attempted. Screws 42 extend through slots in member 40 so that it can be vertically adjusted. Should the work thus engage member 40, said member will be swung toward the cutter and will rotate shaft 43, thus rotating member 47 to lift arm 47a against the tension of spring 48. The portion 47b of member 47 will then press downwardly upon arm 50. This will rotate shaft 50a and oscillate arm 51 toward cutter 12. This action acts to break the toggle formed by members 51 and 53 and pawl 53 is moved out of engagement with tooth 55a on ratchet disk 55. When this happens spring 64 swings rod 55b, thus oscillating disk 55 and shaft 56 and moving contact arm 59 downwardly so that contact 60a is separated from contact 61. This breaks the motor circuit and table 15 and the work thereon is stopped before any damage can be done. The switch comprising members 61 and 60 is easily and quickly brought to closed position by merely swinging rod 55b away from cutter 12. This straightens the toggle formed by members 51 and 53 and engages pawl 53 with disk 55 so that the parts assume the position shown in Fig. 4 with the switch closed.

The three work holders 20, 27 and 28 were disclosed in applicant's prior patent above referred to but the work holder 27 was not controlled as disclosed herein. Work holder 20 herein is also provided with the roller 23.

From the above description it will be seen that I have provided a very simple and efficient structure for producing the desired operation of the machine and preventing objectionable action thereof. The structure disclosed herein constitutes a decided advance in the art and a great improvement on the machine disclosed and claimed in my prior patent above noted. The invention disclosed herein has been demonstrated in actual practice, found to be very successful and efficient and is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. In combination with a rotating cylindrical cutter and a table for moving a flat piece of work to said cutter, a member disposed to engage the top of said piece of work, said member being mounted for swinging movement toward and from said work, a pivot on which said member is carried, a lever arm projecting from said member at the opposite side of said pivot from said member, a spring acting on said lever arm for swinging said member toward said work, an adjustable stop for engaging said lever arm to limit the movement of said member toward said work and an adjustable stop normally spaced from said lever arm for limiting the movement of said member in a direction away from said work in opposition to said spring.

2. In combination with a rotating cylindrical cutter and a table for moving a flat piece of work to said cutter, a member adjacent said cutter disposed to engage the top of said piece of work, said member being mounted for swinging movement toward and from said work, the space between said member and cutter being open and unobstructed, means tending to move said member toward the work, means for limiting the movement of said member toward said work, an adjustable means for limiting the movement of said member in a direction away from said work, said member having capacity of movement to swing into said cutter except as restrained by said last mentioned means.

LEONARD G. OLANDER.